Oct. 2, 1956  R. F. SMITH  2,765,051
WHEEL BRAKE
Filed May 9, 1952  2 Sheets-Sheet 1
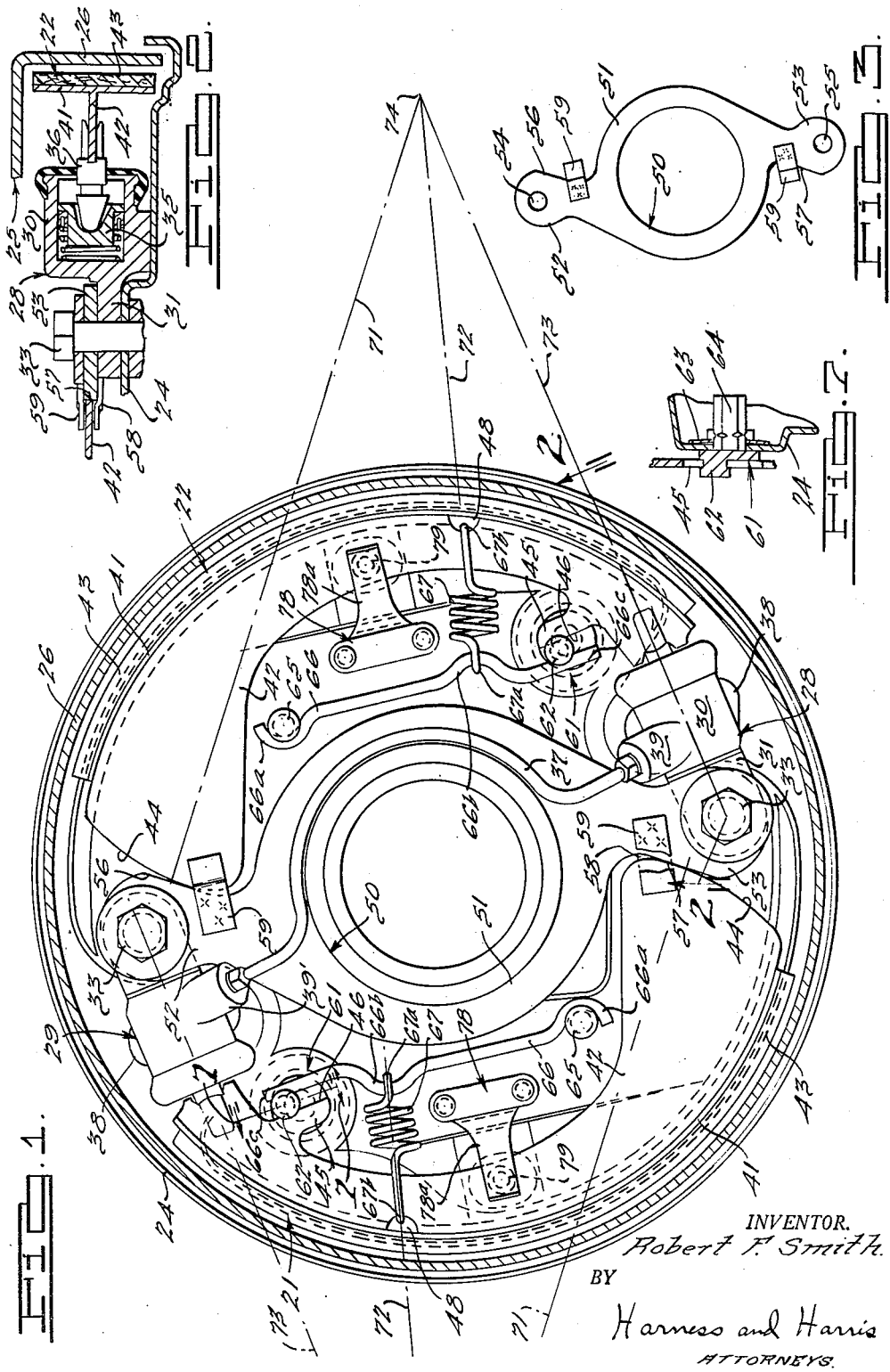
INVENTOR.
Robert F. Smith
BY
Harness and Harris
ATTORNEYS.

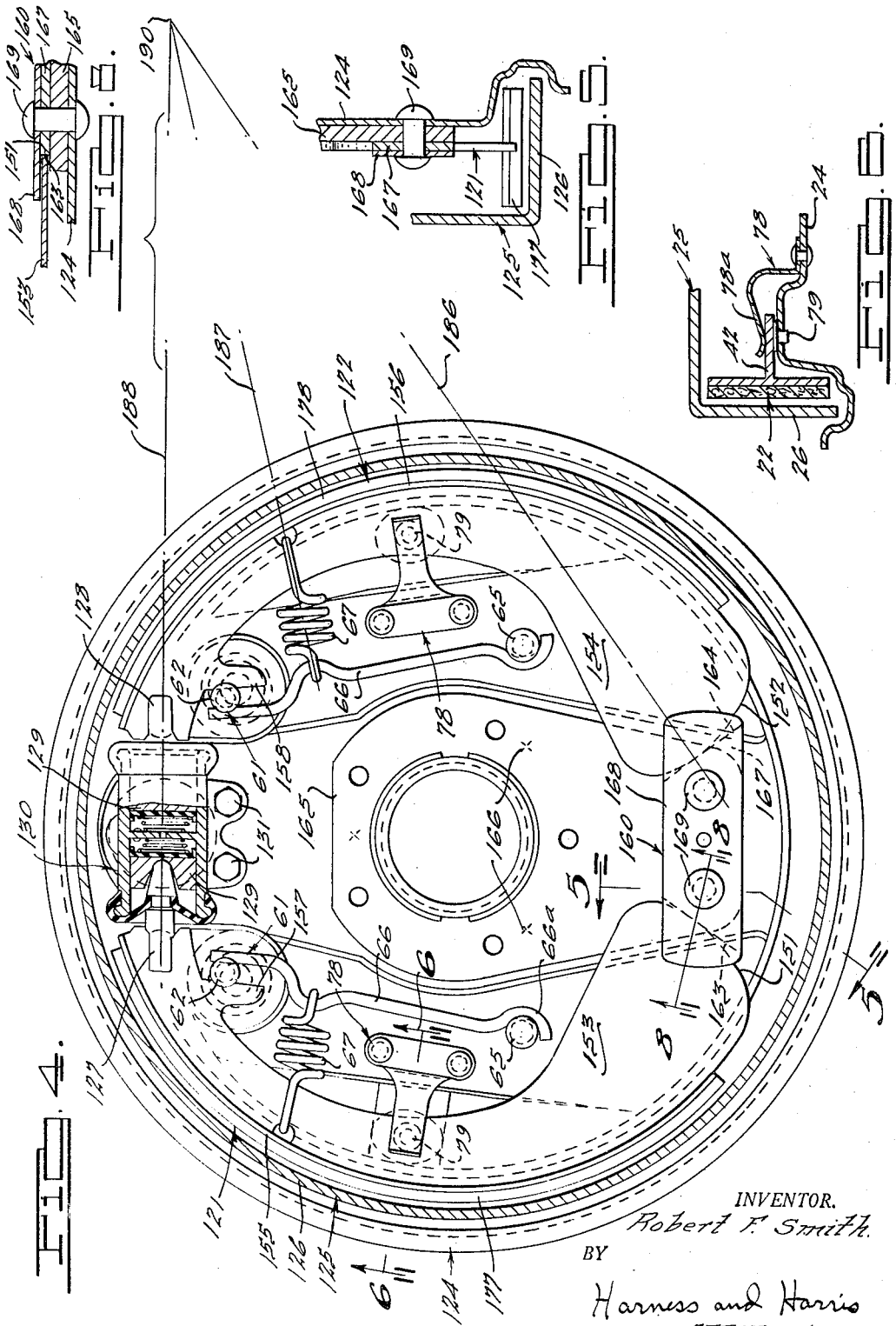

_United States Patent Office_  2,765,051
Patented Oct. 2, 1956

2,765,051

WHEEL BRAKE

Robert F. Smith, Detroit, Mich., assignor to Chrysler Corporation, Highland Park, Mich., a corporation of Delaware Application May 9, 1952, Serial No. 286,934

16 Claims. (Cl. 188—78)

This invention relates to internally expanding "floating shoe" brakes of the "non-servo" type, and particularly to the means for anchoring, centering, and positioning the "floating shoes" of such a brake assembly.

It is a primary object of this invention to provide a "floating shoe" construction that permits a conventional brake assembly with "fixed pivot" brake shoes to be readily converted into a "floating shoe" brake assembly.

It is another object of this invention to provide a novel form of anchor means for "floating" brake shoes that also assists in maintaining the shoes centered with respect to the associated drum.

It is still another object of this invention to provide a novel type of brake shoe return spring mechanism that is simple in design, easy to assemble and install, and associated with the shoe clearance adjusting means in a novel manner.

It is still a further object of this invention to provide a single resilient shoe-positioning means for each brake shoe of a "floating shoe" brake assembly that is arranged to extend between the toe end of the "floating" brake shoe and the clearance adjusting mechanism associated therewith such that the line of action of the resilient shoe positioning means substantially crosses the intersection of the lines of action and reaction applied to the toe and heel ends of the shoe respectively.

It is another object of this invention to provide a "floating shoe" brake assembly having a novel shoe anchor means and an improved type of shoe return spring.

It is still another object of this invention to provide a "floating shoe" brake assembly having the maximum free space within the drum-enclosed area.

The subject matter of this application relating to the brake shoe return spring mechanism per se is included in my divisional application Serial No. 424,993 filed April 22, 1954.

Other objects and advantages of this invention will become readily apparent from a reading of the following description and a consideration of the accompanying drawings wherein:

Figure 1 is a side elevational view, partly in section, of a two leading shoe brake assembly embodying this invention;

Figure 2 is a fragmentary sectional elevational view of portions of the brake assembly shown in Figure 1, this view being taken along the line 2—2 of Figure 1;

Figure 3 is a side elevational view to a reduced scale of the shoe anchor plate utilized in the embodiment of this invention shown in Figure 1;

Figure 4 is a side elevational view, partly in section, of a brake assembly including certain features of this invention, which assembly provides a single leading shoe in either direction of wheel rotation;

Figure 5 is a fragmentary sectional elevational view of portions of the brake assembly shown in Figure 5, this view being taken along the line 5—5 of Figure 4;

Figure 6 is a fragmentary sectional elevational view of portions of the brake assembly shown in Figure 4, this view being taken along the line 6—6 of Figure 4;

Figure 7 is an enlarged, fragmentary, sectional elevational view taken along the line 7—7 of Figure 1 disclosing the brake shoe drum clearance adjusting means; and Figure 8 is a fragmentary sectional elevational view of portions of the anchor plate assembly for the shoes of the brake shown in Figure 4, the view being taken along the line 8—8 of Figure 4.

Considering Figure 1, the brake assembly shown is composed of a pair of "floating," non-servo, leading shoes 21 and 22 respectively. Shoes 21 and 22 are movably mounted on a backing or support plate 24 and are adapted to be moved into and out of engagement with the axially extending, surrounding flange 26 of the rotatable brake drum 25. Fixedly mounted on the backing plate 24, in diametrically opposed positions, are a pair of hydraulically operated brake shoe actuating wheel cylinders 28 and 29 respectively. Each wheel cylinder is identical to the other, so a description of one is thought to be sufficient.

From Figures 1 and 2 it will be noted that the wheel cylinder 28 comprises a cylindrical, cup-shaped, body portion 30 having a flattened mounting flange 31 extending from the outer side of the closed bottom end of the cylinder cup 30. The mounting flange 31 extends substantially axially with respect to the cylinder bore of wheel cylinder 28, and this mounting flange 31 is connected to the inner or front face of the backing plate 24 by the anchor bolt 33. Within the bore in the body portion 30 of the wheel cylinder 28 is an axially reciprocable piston 35. Piston 35 is connected by a plunger rod 36 to the web portion 42 at the toe end of brake shoe 22. Wheel cylinder body portion 30 has a port or inlet (not shown) that is adapted to be connected to a pressure fluid supply line (not shown) to provide for introduction of pressurized fluid to the cylinder bore in the wheel cylinder 28. The backing plate 24 is pierced by an opening 38 to permit connection of the aforementioned pressure fluid supply line (not shown) to the cylinder bore. Wheel cylinder body portion 30 has a bored and threaded boss 39 projecting from its front side, which boss 39 is adapted to be connected by a conduit line 37 to a similar boss 39' on the front side of the wheel cylinder 29, to provide for introduction of pressurized fluid to the bore of wheel cylinder 29.

Each of the brake shoes 21 and 22 is identical in construction, so a description of the shoe 22 is thought to suffice. Shoe 22 is of T-shaped cross sectional configuration (see Figure 2) and is composed of an arcuate table or rim portion 41 and a connected web portion 42 that extends perpendicularly to the inner side of the rim portion 41 along the longitudinal centerline thereof. The outer side of shoe rim portion 41 is covered with a layer of brake lining 43 of conventional construction. The toe end of the web 42 is connected to the associated wheel cylinder 28 through the plunger rod 36 as previously described. The heel end of the shoe web 42 has the end edge 44 thereof shaped to provide a convexly curved portion that is adapted to both roll and/or slide along a substantially radially extending ramp surface 56 of the associated anchor plate 50.

Anchor plate 50 (see Figure 3) has a flat ring-like body portion 51 with diametrically opposed ears 52 and 53 projecting therefrom. Each ear 52 and 53 is pierced by a bolt-receiving opening 54 and 55 respectively, which openings receive the wheel cylinder anchor bolts 33. Each of the ears 52 and 53 has a side edge surface thereof formed with a substantially radially directed ramp surface 56 and 57 respectively. Each of the ears 52, 53 has a pair of brake shoe guide plates, 58 and 59 respectively, mounted on the opposite sides thereof adjacent the ramp surfaces 56, 57 respectively. Guide plates 58 and 59 may be welded to opposite sides of the ears 52, 53 and they project beyond the sides of the ears 52, 53 so as to provide slots (see Figure 2) that receive the web portions 42 of the brake shoes. The guide plates 58, 59 thus provide a means for centering and guiding the brake shoes 21, 22 relative to the width of the brake drum flange 26 and they also resist cocking or tipping of the shoes relative to the brake drum flange 26.

Each of the brake shoes 21, 22 has a radially extending finger 45 projecting from its web portion 42 adjacent the toe end of the shoe. Each web finger 45 is adapted to cooperate with a rotatable cam element 61 (see Figure 7) that is carried by the brake support plate 24 so as to provide a mechanism to set and adjust the clearance between the brake shoe linings 43 and the encircling drum flange 26. Cam element 61 has an eccentrically mounted post portion 62 that is adapted to be engaged with and to slide along the edge surface 46 of the brake shoe web finger 45 during rotation of the cam element 61. It is thought to be obvious that rotation of the cam element 61 will cause the post portion 62 thereof to act upon the web finger side edge 46 such that the associated brake shoe will be moved relative to the encircling brake drum. Cam element 61 has a spring washer 63 encircling the shaft 64 of the cam element and engaged with the outer side of brake support plate 24 so as to retain the cam element in its adjusted position. Shaft 64 of the cam element 61 is formed with flat faces that are readily engaged by a wrench or the like to facilitate rotation of the cam element.

The rotatable cam elements 61 not only provide means to adjust the drum clearance between the brake shoes and the encircling drum flange 26, but in addition, these cam elements 61 provide a portion of the brake shoe return spring anchor means. The brake shoe return spring mechanism shown is an improvement over that shown in the copending application of Robert F. Smith, Serial No. 111,461 filed August 20, 1949, now U. S. Patent No. 2,621,761. It is an object of this invention, as previously pointed out, to provide a brake shoe return spring mechanism that is easy to assemble, economical, durable, and one that will give the maximum free space within the brake assembly. The brake shoe return spring mechanism disclosed accomplishes each of these noted objects. The shoe return spring mechanisms associated with the brake shoes 21, 22 each comprise an anchor stud 65 that is carried by the brake support or backing plate 24. Extending between the stud 65 and the eccentrically mounted cam post 62 is a wire strut member 66. Strut member 66 has its end 66a curved to seat about the associated anchor stud 65. Intermediate the ends of strut 66 a curved seat 66b is formed to provide an anchor for one end 67a of a resilient tension spring element 67. The other end 67b of the spring element 67 is anchored in an aperture 48 formed in the web 42 of the associated brake shoe. The end portion 66c of the strut 66 is substantially straight and is adapted to press against and to permit the cam post 62 to slide therealong during adjustment of the brake shoe drum clearance.

It will be noted that the shoe return springs 67 exert a force along a line 72 that tends to pull the heel edge 44 of the associated brake shoe against its anchor ramp surface 57 and to also retract the toe end of the associated shoe toward its actuating wheel cylinder. Thus the shoe return spring 67 not only retracts the shoe, but also tends to maintain the shoe heel end 44 in its adjusted position on the anchor ramp 57.

In addition to being formed of inexpensive, simple parts, this shoe return spring mechanism is designed so that the minimum size springs may be used and these small springs kept within their elastic limits regardless of the amount of brake shoe lining wear and consequent brake shoe adjustment. By anchoring the end 66c of the strut 66 against the eccentrically mounted shoe adjusting cam post 62, it will be seen that as the shoe is adjusted and moved outwardly to compensate for lining wear, that the strut 66 also moves outwardly and consequently no increased stresses are set up in the return spring 67. This theory is more thoroughly explained in copending application Serial No. 111,461, now U. S. Patent No. 2,621,-761, that was previously mentioned. As the spring stresses set up in return springs 67 are more or less fixed and relatively low, a small size, inexpensive return spring may be utilized. Furthermore, as the springs 67 do not extend between the opposed brake shoes 21, 22, there is provided the maximum free space within the brake assembly. Due to the low strength springs 67 and their arrangement in the brake assembly, it is possible to assemble the return springs 67 in the brake assembly without the use of any special spring stretching tools or the like and thus time and cost of brake assembly is materially reduced.

The principles of "floating shoe" control, disclosed in the copending application of A. R. Trahern, Serial No. 256,706, filed November 16, 1951, may be applied to a brake assembly embodying this invention, for it will be noted that the lines of action 71, 72, 73 of the several forces acting on the shoe 22, all converge towards the common center 74. Accordingly, there are no moments tending to shift the heel end 44 of the shoe 22 along the ramp 56 so as to alter the self-centering action of the shoes of this brake assembly. Line of action 71 is the line along which the force line of the anchor plate reaction acts. Line of action 72 is the line of action of the brake shoe return spring 67. Line of action 73 is the line of action of the wheel cylinder piston 35 that actuates the brake shoe 22. As these lines 71, 72, 73 all intersect at 74, a stable self-adjusting "floating shoe" brake is provided.

Also mounted on the backing plate 24 are a pair of J-shaped shoe hold down springs 78 (see Figure 6) that have the leg portions 78a pressed against the web portions 42 of the associated brake shoes 21, 22. Springs 78 urge the shoes 21, 22 against raised bosses 79 that project from the inner or front face of the backing plate 24. Springs 78 and bosses 79 are each well known means of positioning brake shoes within a brake drum and no claim is made herein regarding the novelty of these elements.

As the brake shoes 21 and 22 are identical and as there are two sets of identical shoe-operating elements associated with these two shoes 21, 22, there has been a complete description of the elements associated with only the shoe 22. The similar elements associated with shoe 21 carry reference numerals corresponding to the identical elements described with regard to brake shoe 22.

Figures 4–8 show a "floating shoe" brake assembly that contains two "floating," non-servo shoes 121 and 122 arranged such that only one shoe is self-energizing in each direction of rotation of the brake drum 125. Shoes 121 and 122 are shiftably mounted on the backing or support plate 124 so that they may be expanded radially to engage the inner side of the brake drum flange 126. The toe ends of the two shoes 121 and 122 are each connected through plunger rods 127 and 128 respectively, to one of the pair of reciprocable piston elements 129 carried within the double piston, shoe actuating wheel cylinder 130. Wheel cylinder 130 is fixedly mounted on the backing plate 124 by the bolt connectors 131.

Brake shoes 121 and 122 are of T-shaped cross sectional configuration and are substantially identical to the shoes 21 and 22 already described relative to Figures 1–4. The heel end edges 151 and 152 of the webs 153 and 154 of brake shoes 121 and 122 respectively, are convexly curved so that they may roll and/or slide along their respective ramp-like anchor surfaces 163 and 164 of the anchor block 160. Shoes 121 and 122 carry web fingers 157 and 158 respectively, that are engageable with shoe clearance adjusting mechanisms 61.

The anchor block 160, that provides the substantially radially extending shoe ramp surfaces 163 and 164, is in reality a laminated construction composed of portions of the backing plate 124, portions of the backing plate reinforcement plate 165 that is welded to the backing plate 124, as indicated at 166, a plate member 167 of trapezoidal configuration having converging end edges 163, 164 that actually provide the anchor ramp surfaces for the brake shoes, and a cover plate 168. The several elements 124, 165, 167, and 168 are held together in assembled relation by the rivet connectors 169. It will be noted that the ends of plate 167 that provide the shoe ramps 163 and 164 are set in from the ends of the plates 165 and 168 so that plates 165 and 168 form guide wings for the shoe web portions 151 and 152 that are engaged with the anchor block ramp surfaces 163 and 164. The wing-like projections provided by the plates 165 and 168 serve as guides for the brake shoe webs 153 and 154 so that the brake shoes will be restrained from cocking relative to the brake drum flange 126.

In addition to the shoe web guides provided by the spaced plates 165 and 168, shoe centering springs 78 similar to those described for the Figure 1 brake may be provided. These J-shaped spring elements 78 urge the shoes 121 and 122 toward the backing plate 124.

Rotatable, cam type, shoe clearance adjusting cams 61 similar to those described for the Figure 1 brake are also carried by the backing plate 124 to provide for adjustment of the normal clearance between the brake shoe linings 177 and 178 and the encircling drum flange 126.

Brake shoe return spring mechanisms 65–67, similar to those described for the Figure 1 brake, are also utilized in the Figure 4 form of this invention. The brake shoe return spring mechanisms for the Figure 4 brake are associated with the shoe clearance adjusting mechanism 61 in the same manner as described for the Figure 1 brake.

As was the case with the form of the invention shown in Figures 1–4, the Figure 5–8 form of the invention has the several lines of action of the forces acting on the brake shoes all passing through a common center point or center area at least. The line of action 186 for the anchor reaction force passes through the common center 190. The line of action 187 of the brake shoe return spring 67 passes through the common center 190. The line of action 188 of the shoe actuating piston 129 also passes through the common center 190. The arrangement of the several brake elements to insure that the lines of action for all forces applied to the brake shoes pass through a common center point tends to prevent interference with the inherent self centering action of the brake shoes 121, 122 relative to the brake drum flange 126. The advantages of such an arrangement are clearly pointed out in the aforementioned copending application of A. R. Trahern.

I claim:

1. In a floating shoe brake assembly, an annular, relatively fixed, backing plate, a pair of hydraulically operated brake shoe actuators mounted on said backing plate at diametrically opposed positions, a bolt-like connector fastening each of said actuators to said backing plate, an anchor plate extending between and carried by said bolt-like connectors, said anchor plate having portions thereof formed to provide a pair of diametrically opposed, substantially radially extending ramp surfaces, a brake shoe extending circumferentially between each actuator and one of the ramp surfaces on the anchor plate, said shoes each having the toe end thereof connected to an actuator and the heel end thereof engaged with an anchor plate ramp surface for movement therealong, and resilient means continuously urging the toe and heel ends of each of said shoes into retracted positions against their associated actuator and anchor plate ramp surface.

2. In a floating shoe brake assembly, an annular, relatively fixed, backing plate, a pair of hydraulically operated brake shoe actuators mounted on said backing plate at diametrically opposed positions, a bolt-like connector fastening each of said actuators to said backing plate, an anchor plate extending between and carried by said bolt-like connectors, said anchor plate having portions thereof formed to provide a pair of diametrically opposed, substantially radially extending ramp surfaces, a brake shoe extending circumferentially between each actuator and one of the ramp surfaces on the anchor plate, said shoes each having the toe end thereof connected to an actuator and the heel end thereof engaged with an anchor plate ramp surface for movement therealong, and resilient means continuously urging the toe and heel ends of each of said shoes into retracted positions against their associated actuator and anchor plate ramp surface, said anchor plate having slot-like guide portions thereon engageable with portions of each shoe to guide the movement of the brake shoes within the brake assembly.

3. In a floating shoe brake assembly, an annular, relatively fixed, backing plate, a pair of hydraulically operated brake shoe actuators mounted on said backing plate at diametrically opposed positions, a bolt-like connector fastening each of said actuators to said backing plate, an anchor plate extending between and carried by said bolt-like connectors, said anchor plate having portions thereof formed to provide a pair of substantially opposed, substantially radially extending ramp surfaces, a brake shoe extending circumferentially between each actuator and one of the ramp surfaces on the anchor plate, said shoes each having the toe end thereof connected to an actuator and the heel end thereof engaged with an anchor plate ramp surface for movement therealong, and resilient means continuously urging the toe and heel ends of each of said shoes into retracted positions against their associated actuator and anchor plate ramp surface, the lines of action of the forces applied to each shoe by the associated actuator and resilient means, as well as that of the reaction force that is normal to the ramp surface at the point of engagement of the shoe with its associated ramp surface, each passing through a common center.

4. In a floating shoe brake assembly, a support plate, a pair of brake shoe actuators mounted on said support plate at diametrically opposed positions, fastener means fixedly connecting the actuators to the support plate, a substantially flat anchor plate extending between and mounted on said actuator fastener means, said anchor plate having adjacent each actuator an edge portion arranged to provide a substantially-radially extending shoe anchor ramp surface, a brake shoe extending circumferentially between each actuator and the shoe anchor ramp mounted adjacent the other actuator, said shoes each comprising a rim portion and a connected web portion, the shoe web portion of each shoe having the toe end thereof connected to an actuator and the heel end thereof convexly curved to provide portions to roll and/or slide along the shoe anchor plate ramp surface supporting the particular shoe, guide portions carried by said anchor plate receiving the shoe web portions and controlling movement thereof, and resilient means continuously urging each of said brake shoes into engagement with the associated actuator and the associated shoe supporting anchor plate ramp surface.

5. In a floating shoe brake assembly, an annular support plate, a pair of brake shoe actuators fixedly mounted on said support plate at substantially diametrically opposed positions, a substantially ring-shaped, flat anchor plate mounted on said support plate, said anchor plate having diametrically opposed radially extending, outwardly projecting ears each of which is formed with an edge portion arranged to provide a substantially radially extending brake shoe anchor ramp surface, a brake shoe extending circumferentially of the brake assembly between each actuator and one of the brake shoe anchor plate ramp surfaces, said shoes each comprising a rim portion and a connected web portion, the shoe web portions of each shoe having the toe end thereof connected to an actuator and the heel end thereof convexly curved to provide portions to roll and/or slide along the associated brake shoe anchor plate ramp surface supporting the heel of that particular shoe, and resilient means continuously urging each of said brake shoes into engagement with the associated actuator and shoe supporting anchor plate ramp surface.

6. In a floating shoe brake assembly, an annular support plate, a pair of brake shoe actuators fixedly mounted on said support plate at substantially diametrically opposed positions, a substantially ring-shaped, flat anchor plate mounted on said support plate, said anchor plate having diametrically opposed, radially extending, outwardly projecting ears each of which is formed with an edge portion arranged to provide a substantially radially extending brake shoe anchor ramp surface, a brake shoe extending circumferentially of the brake assembly between each actuator and one of the brake shoe anchor plate ramp surfaces, said shoes each comprising a rim portion and a connected web portion, the shoe web portions of each shoe having the toe end thereof connected to an actuator and the heel end thereof convexly curved to provide portions to roll and/or slide along the associated brake shoe anchor plate ramp surface supporting the heel of that particular shoe, and resilient means continuously urging each of said brake shoes into engagement with the associated actuator and shoe supporting anchor plate ramp surface, said resilient means being arranged such that the line of action of each of the said resilient elements exerts a force on the associated shoe that holds the heel of that shoe against the anchor plate ramp surface supporting said shoe.

7. In a floating shoe brake assembly, an annular support plate, a pair of brake shoe actuators fixedly mounted on said support plate at substantially diametrically opposed positions, a substantially ring-shaped, flat anchor plate mounted on said support plate, said anchor plate having diametrically opposed, radially extending, outwardly projecting ears each of which is formed with an edge portion arranged to provide substantially radially extending brake shoe anchor ramp surface, a brake shoe extending circumferentially of the brake assembly between each actuator and one of the brake shoe anchor plate ramp surfaces, said shoes each comprising a rim portion and a connected web portion, the shoe web portions of each shoe having the toe end thereof connected to an actuator and the heel end thereof convexly curved to provide portions to roll and/or slide along the associated brake shoe anchor plate ramp surface supporting the heel of that particular shoe, a pair of rotatable shaft-like elements carried by said support plate, each element having eccentrically arranged cam portions engageable with a brake shoe portion to adjust the position of the shoe in the assembly, a pair of anchor posts carried by said support plate, each anchor post being spaced from one of said rotatable elements, a strut extending between each one of the rotatable elements and one of the anchor posts, and a resilient element tensioned between each strut and one of the brake shoes to urge the shoes against their associated actuators and anchor plate ramp surfaces.

8. In a floating shoe brake assembly, an annular support plate, a pair of brake shoe actuators fixedly mounted on said support plate at substantially diametrically opposed positions, a substantially ring-shaped, flat anchor plate mounted on said support plate, said anchor plate having diametrically opposed, radially extending, outwardly projecting ears each of which is formed with an edge portion arranged to provide a substantially radially extending brake shoe anchor ramp surface, a brake shoe extending circumferentially of the brake assembly between each actuator and one of the brake shoe anchor plate ramp surfaces, said shoes each comprising a rim portion and a connected web portion, the shoe web portions of each shoe having the toe end thereof con-
nected to an actuator and the heel end thereof convexly curved to provide portions to roll and/or slide along the associated brake shoe anchor plate ramp surface supporting the heel of that particular shoe, said anchor plate having guide fingers mounted thereon and engageable with the shoe web portions to guide the movement thereof, and resilient means continuously urging each of said brake shoes into engagement with the associated actuator and shoe supporting anchor plate ramp surface.

9. In a floating shoe brake assembly, an annular support plate, a pair of brake shoe actuators arranged on said support plate at diametrically opposed positions, fastener means fixedly connecting the actuators to the support plate, a substantially ring-like flat anchor plate having outwardly projecting, diametrically opposed ears that are mounted on said actuator fastener means, said anchor plate ears each having an edge portion arranged to provide a substantially radially extending shoe ramp surface, a brake shoe extending between each actuator and the anchor plate ear mounted on the fastener means associated with the other actuator, said shoes each comprising a rim portion and a connected web portion, the shoe web portions of each shoe having the toe end thereof connected to an actuator and the heel end thereof convexly curved to provide rounded portions to roll and/or slide along the anchor plate ramp surface supporting the particular shoe heel portion, a rotatable element mounted on said support plate adjacent the toe end of each brake shoe, said rotatable elements each having an eccentrically positioned cam portion engageable with portions of the adjacent brake shoe to provide for adjustment thereof, an anchor post mount on the support plate adjacent the heel end of each shoe, a strut member extending between the cam portion and the anchor post adjacent each shoe, and resilient means tensioned between each strut member and the associated brake shoe.

10. In a floating shoe brake assembly, an annular support plate, a pair of brake shoe actuators arranged on said support plate at diametrically opposed positions, fastener means fixedly connecting the actuators to the support plate, a substantially ring-like flat anchor plate having outwardly projecting, diametrically opposed ears that are mounted on said actuator fastener means, said anchor plate ears each having an edge portion arranged to provide a substantially radially extending shoe ramp surface, a brake shoe extending between each actuator and the anchor plate ear mounted on the fastener means associated with the other actuator, said shoes each comprising a rim portion and a connected web portion, the shoe web portions of each shoe having the toe end thereof connected to an actuator and the heel end thereof convexly curved to provide rounded portions to roll and/or slide along the anchor plate ramp surface supporting the particular shoe heel portion, a rotatable element mounted on said support plate adjacent the toe end of each brake shoe, said rotatable elements each having an eccentrically positioned cam portion engageable with portions of the adjacent brake shoe to provide for adjustment thereof, an anchor post mounted on the support plate adjacent the heel end of each shoe, a strut member extending between the cam portion and the anchor post adjacent each shoe, and resilient means tensioned between each strut member and the associated brake shoe, the lines of action of the resilient means, the actuator and the anchor plate reaction associated with each shoe substantially intersecting at a common point.

11. In a floating shoe brake assembly, an annular support plate, a pair of brake shoe actuators arranged on said support plate at diametrically opposed positions, fastener means fixedly connecting the actuators to the support plate, a substantially ring-like flat anchor plate having outwardly projecting, diametrically opposed ears that are mounted on said actuator fastener means, said anchor plate ears each having an edge portion arranged to provide a substantially radially extending shoe ramp surface, a brake shoe extending between each actuator and the anchor plate ear mounted on the fastener means associated with the other actuator, said shoes each comprising a rim portion and a connected web portion, the shoe web portions of each shoe having the toe end thereof connected to an actuator and the heel end thereof convexly curved to provide rounded portions to roll and/or slide along the anchor plate ramp surface supporting the particular shoe heel portion, guideway formations carried by said anchor plate adjacent each brake shoe anchor plate ramp surface and engageable with the web portions of the brake shoes to resist cocking thereof, a rotatable element mounted on said support plate adjacent the toe end of each brake shoe, said rotatable elements each having an eccentrically positioned cam portion engageable with portions of the adjacent brake shoe to provide for adjustment thereof, an anchor post mount on the support plate adjacent the heel end of each shoe, a strut member extending between the cam portion and the anchor post adjacent each shoe, and resilient means tensioned between each strut member and the associated brake shoe.

12. An anchor plate unit adapted to be mounted on the support plate of a floating shoe brake assembly comprising a ring-like plate having a pair of diametrically disposed, radially extending, outwardly projecting portions, each of which portions mounts a substantially radially extending ramp surface along a side edge thereof.

13. In a floating shoe brake assembly, a support plate, a pair of brake shoe actuators mounted on said support plate at substantially diametrically opposed positions, fastener means fixedly connecting the actuators to the support plates, a substantially ring-like flat, anchor plate mounted between said actuator fastener means, said anchor plate having edge portions arranged to provide a pair of substantially radially extending shoe ramp surfaces located at opposite sides of the brake assembly, a brake shoe extending circumferentially between each actuator and one of the anchor plate ramp surfaces of the anchor plate, said shoes each comprising a rim portion and a connected web portion, the shoe web portions of each shoe having the toe end thereof connected to an actuator and the heel end thereof convexly curved to provide portions to roll and/or slide along the anchor plate ramp surface supporting the particular shoe, guide means carried by the anchor plate and slidably engageable with the brake shoe web portions to control movement thereof, and resilient means continuously urging each of said brake shoes into engagement with the associated actuator and shoe supporting anchor plate ramp surface.

14. In a floating shoe brake assembly, a support plate, a pair of brake shoe actuators fixedly mounted on said support plate at substantially opposed positions, an anchor plate mounted on said support plate, said anchor plate having a pair of opposed, radially extending portions each arranged to provide a substantially radially extending brake shoe anchor plate ramp surface, a brake shoe extending peripherally of the brake assembly between each actuator and one of the brake shoe anchor plate ramp surfaces, said shoes each having the toe end thereof connected to an actuator and the heel end thereof shaped to provide portions to roll and/or slide along the associated brake shoe anchor plate ramp surface supporting the heel of that particular shoe, and resilient means continuously urging each of said brake shoes into engagement with the associated actuator and shoe supporting anchor plate ramp surface.

15. A brake assembly comprising an annular support plate, a wheel cylinder mounted on said support plate, a brake shoe anchor assembly mounted on said support plate at a location substantially diametrically opposite said wheel cylinder, and an arcuate brake shoe arranged so that it extends between said wheel cylinder and one side of the shoe anchor assembly, said shoe having the toe end connected to said wheel cylinder for actuation thereby and the heel end thereof engaged with and formed to roll and/or slide along a side of the shoe anchor assembly so as to provide a floating brake shoe, said shoe anchor assembly comprising an anchor plate having mounted thereon a pair of transversely spaced guide plates that have shoe guiding portions overlapping and extending beyond the shoe engaged side of the anchor plate to provide a slot for the reception of the heel end portion of the associated brake shoe, and shoe positioning means connected between the support plate and the associated brake shoe comprising a rotatable cam mounted on said support plate with the cam surface thereof adjacent and contacting the toe portion of the brake shoe, an anchor post mounted on the support plate with the anchor post substantially adjacent the heel end of the brake shoe, a strut member extending between the cam member and the anchor post, and a resilient means tensioned between the strut and the brake shoe.

16. A brake assembly comprising a support plate, a wheel cylinder mounted on said support plate, an anchor block assembly mounted on said support plate at a location diametrically opposite said wheel cylinder, and a floating brake shoe arranged so that the brake shoe extends circumferentially between the wheel cylinder and the anchor block assembly, said shoe having the heel end thereof formed to roll and/or slide along the engaged side of the anchor block assembly, said anchor block assembly comprising an anchor plate mounted between a pair of guide plates that have guide portions extending beyond the sides of the anchor plate to provide a slot for the reception of the heel end of the associated brake shoe, and shoe positioning means connected between the support plate and the associated brake shoe comprising a rotatable cam mounted on said support plate with the cam adjacent and contacting the toe portion of the brake shoe, an anchor post mounted on the support plate with the anchor post adjacent the heel end of the shoe, a strut member extending between the cam member and the anchor post adjacent the heel end of the shoe, and a resilient means tensioned between the strut and the adjacent shoe.

References Cited in the file of this patent

UNITED STATES PATENTS

| | | |
|---|---|---|
| 2,181,029 | Thomas | Nov. 21, 1939 |
| 2,372,319 | Francois | March 27, 1945 |
| 2,431,551 | Goepfrich | Nov. 25, 1947 |
| 2,453,866 | Schnell | Nov. 16, 1948 |
| 2,466,425 | House et al. | April 5, 1949 |
| 2,509,643 | House | May 30, 1950 |
| 2,516,995 | House | Aug. 1, 1950 |
| 2,583,888 | Schnell | Jan. 29, 1952 |
| 2,595,143 | House | April 29, 1952 |
| 2,637,417 | House | May 5, 1953 |